(12) United States Patent
Martin et al.

(10) Patent No.: US 10,455,379 B1
(45) Date of Patent: Oct. 22, 2019

(54) MESSAGE PROCESSING AND DELIVERY

(71) Applicant: Verizon Patent and Licensing Inc., Arlington, VA (US)

(72) Inventors: Kathleen Martin, Howell, NJ (US); John M. Walker, Nazareth, PA (US); Matthew A. Fisher, Nesbit, MS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/967,162

(22) Filed: Apr. 30, 2018

(51) Int. Cl.
*H04W 4/14* (2009.01)
*G06Q 30/00* (2012.01)

(52) U.S. Cl.
CPC ............ *H04W 4/14* (2013.01); *G06Q 30/01* (2013.01)

(58) Field of Classification Search
CPC ............................... H04W 4/14; G06Q 30/01
USPC ......................................................... 455/466
See application file for complete search history.

(56) References Cited

U.S. PATENT DOCUMENTS

| 9,767,462 | B2 * | 9/2017 | Byers | G06Q 30/02 |
| 2003/0069031 | A1 * | 4/2003 | Smith | H04L 51/38 |
| | | | | 455/466 |
| 2011/0223944 | A1 * | 9/2011 | Gosselin | H04W 4/21 |
| | | | | 455/466 |
| 2012/0058776 | A1 * | 3/2012 | Ligeret | H04L 51/38 |
| | | | | 455/456.1 |

* cited by examiner

*Primary Examiner* — Shahriar Behnamian

(57) ABSTRACT

A device receives data containing short message service (SMS) messages to be delivered to target recipients, information regarding the target recipients, and a message delivery hours constraint. The device stores the data in records, determines that an SMS message, that is included in a record, is to be processed for delivery, and processes the SMS message to generate a parsed SMS message. The device assigns the parsed SMS message to a time-zone-based job queue based on a time zone identified for the target recipient, determines whether the message delivery hours constraint, relative to the time zone, is satisfied, and performs one or more actions to cause the parsed SMS message to be provided to a messaging platform for delivery to the target recipient based on determining that the message delivery hours constraint, relative to the time zone, is satisfied.

20 Claims, 10 Drawing Sheets

US 10,455,379 B1

MESSAGE PROCESSING AND DELIVERY

BACKGROUND

A company that conducts transactions with a large quantity of customers typically utilizes a cloud-based customer relationship management (CRM) product or platform to manage the company's customer base. A CRM platform can interface with one or more web-based application platforms, such as messaging applications, to provide additional capabilities for interacting with customers and/or conducting transactions.

DETAILED DESCRIPTION OF PREFERRED EMBODIMENTS

Figure 1A:
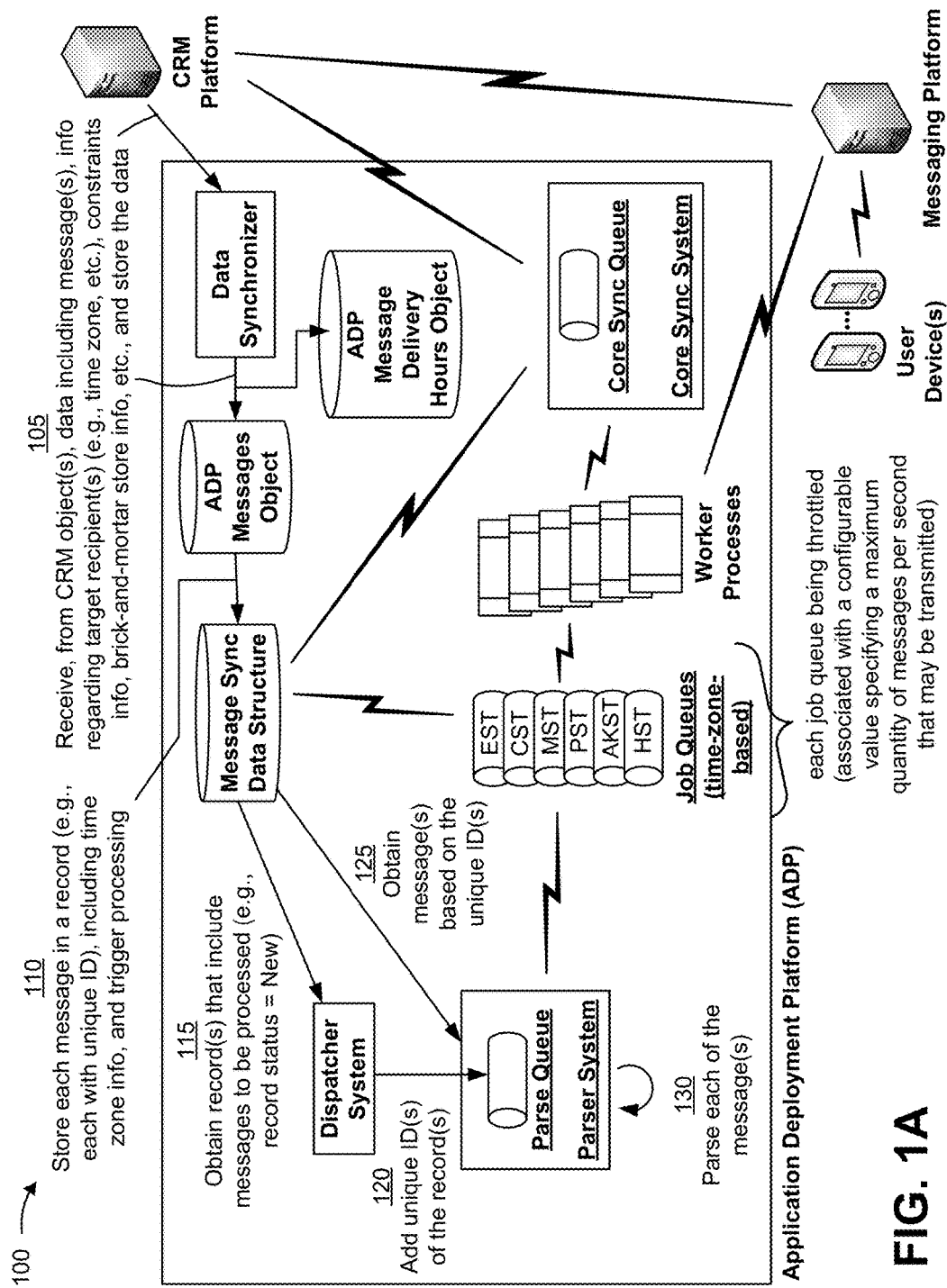
FIGS. 1A-1D are diagrams of an overview of an example implementation described herein.

The following detailed description of example implementations refers to the accompanying drawings. The same reference numbers in different drawings can identify the same or similar elements.

In many cases, a CRM platform, even when configured to interface with a messaging application (such as a short message service (SMS) messaging system), provides limited capability for an entity (e.g., a company) to send a high volume of messages to numerous target recipients (e.g., customers or leads) in an efficient manner, and to conduct two-way messaging with the target recipients. Currently available applications, such as applications deployable via application deployment platforms, are also limited in such respects.

Some implementations, described herein, provide the capability for an entity (e.g., a company) to send a high volume of messages (e.g., SMS messages, multimedia messaging service (MMS) messages, enterprise messaging system (EMS) messages, and/or the like) to numerous target recipients (e.g., customers or leads who have expressed an interest in certain promotions or who have visited brick-and-mortar store(s) and agreed to receive follow-up text messages) in an efficient manner, and to conduct two-way messaging with the target recipients. In some implementations, an application deployment platform (ADP) (e.g., one or more applications deployed by the ADP) is capable of receiving, from a CRM platform, messages to be delivered to target recipients, processing the messages, and dispositioning and scheduling the processed messages for delivery (e.g., for delivery by a messaging platform) through the use of multiple time-zone-based job queues that are configured to handle message delivery based on message delivery hours constraints (e.g., where messages are permitted to be sent only during certain hours, such as business hours) and the time zone that is associated with each target recipient. In some implementations, the ADP is capable of identifying priorities associated with various message types, and delivering messages based on the priorities. In this way, implementations described herein permit a high volume of messages to be processed and delivered in parallel (e.g., in cases where business hours overlap across multiple time zones), which increases the overall message processing and delivery efficiency (e.g., maximizes a quantity of outbound messages per unit time), thereby conserving power, computing, and memory resources that would otherwise be needed to facilitate inefficient, prolonged message delivery.

In some implementations, the application deployment platform is capable of supporting two-way messaging between the entity (e.g., a representative of the entity, such as a sales representative) and the target recipients, which enhances the entity's ability to service customers, thereby increasing a sales-to-lead conversion ratio. In some implementations, the application deployment platform is capable of processing a variety of message types (e.g., messages associated with leads relating to abandoned carts, messages associated with leads relating to advertisement campaigns, and/or the like), and processing the messages by parsing dynamic content into messages to uniquely tailor the messages to individual target recipients. This permits the same message, intended for multiple customers, to be customized with each customer's personal information, information regarding each customer's local brick-and-mortar store, information regarding a store manager of each such local brick-and-mortar store (e.g., a name of the store manager), and/or the like, and permits the inclusion of embedded codes in messages—such as for purposes of tracking customer click-throughs to service or product landing pages and purchases made on such landing pages, and performing accounting relating to such purchases (e.g., for commissions due to a sales representative who serviced or assisted each customer).

FIGS. 1A-1D are diagrams of an overview of an example implementation 100 described herein. As shown in FIGS. 1A-1D, example implementation 100 can include an application deployment platform (ADP), a CRM platform, a messaging platform, and user device(s). The CRM platform can maintain CRM object(s) or data structures (e.g., in the form of database tables that include columns (e.g., fields) and rows (e.g., records)). As shown in FIGS. 1A-1D, the ADP can include a data synchronizer, an ADP messages object, and an ADP message delivery hours object. As shown, the ADP can additionally include a message sync data structure, a dispatcher system, a parser system having a parse queue, multiple time-zone-based job queues, worker processes, and a core sync system having a core sync queue.

As shown in FIG. 1A, and as shown by reference number 105, the data synchronizer can receive, from CRM object(s) maintained by the CRM platform, data containing message(s), information regarding target recipients of the message(s), message delivery hours constraints information, brick-and-mortar store information, and/or the like, and store the data (e.g., in the ADP messages objects and/or the ADP message delivery hours object). In some implementations, the data synchronizer can be configured to synchronize data (e.g., based on one or more mapping tables) between the CRM platform and the ADP such that a change in data in the CRM platform is reflected in corresponding data in the ADP.

In some implementations, the CRM object(s) can be associated with an entity (e.g., a company) that utilizes the CRM platform for customer relationship management purposes. In some implementations, the CRM object(s) can include a CRM lead object that includes data regarding one or more sales leads (e.g., identifiers (e.g., lead IDs), data corresponding to a variety of lead types (e.g., an advertisement campaign in which an advertisement message (e.g., an offer to purchase product(s) and/or service(s)) is to be delivered to multiple target recipients (e.g., customers or prospective customers), an abandoned cart event in which a message is to be delivered to a customer, or prospective customer, who abandoned a shopping cart), and/or the like), a CRM messages object (e.g., an SMS messages object) that includes data regarding one or more messages that are to be delivered to target recipients, a CRM brick-and-mortar stores object that includes data regarding one or more brick-and-mortar stores associated with the entity (e.g., a name and/or address of a store, a phone number associated with the store, a name of a representative employed at the store, a name of a manager of the store, and/or the like), a CRM message delivery hours object that includes data regarding message delivery hours constraints (e.g., data specifying certain hours, such as business hours, during which messages are permitted to be sent).

In some implementations, a message can be a text message, such as an SMS message. In some implementations, a message can include a message template with one or more fields that can be populated with dynamic content (e.g., merge field substitutions, such as those for target recipient name (e.g., contact name), a brick-and-mortar store name and/or location, a representative name or ID (e.g., a name or ID of a representative of an entity who is assigned to service or assist the target recipient, or an ID (e.g., an "owner" ID) associated with a representative who is the "owner" of the lead), and/or the like).

In some implementations, the information regarding target recipient(s) can include, among other information, a unique ID and time zone information. Time zone information can identify a time zone (e.g., Eastern Standard Time (EST), Eastern Daylight Time (EDT), Central Standard Time (CST), Central Daylight Time (CDT), Mountain Standard Time (MST), Mountain Daylight Time (MDT), Pacific Standard Time (PST), Pacific Daylight Time (PDT), Alaska Standard Time (AKST), Alaska Daylight Time (AKDT), Hawaii Standard Time (HST), Hawaii-Aleutian Daylight Time (HADT), and/or the like) associated with a target recipient. In some implementations, a time zone associated with a target recipient can be determined based on the target recipient's billing or shipping address and/or the like. In a case where the CRM object(s) include a CRM lead object, the information regarding target recipient(s) can include information identifying an entity, such as a name of a representative who is assigned to service the lead/target recipient (e.g., follow up with the lead) and/or the like.

In some implementations, the ADP messages object can store messages, information regarding target recipients of the messages (e.g., a unique ID associated with each target recipient, a name of each target recipient, and/or the like), brick-and-mortar store information, and/or the like received by the data synchronizer (e.g., from the CRM messages object).

In some implementations, the ADP message delivery hours object can be configured to store data (e.g., received by the data synchronizer (e.g., from the CRM message delivery hours object)) identifying constraint(s) or rule(s) that specify the days of a week and/or time of day (e.g., hours of a day) during which a message is permitted to be transmitted to a target recipient. For example, a constraint or rule can specify that a message can only be sent to a target recipient during business hours (e.g., only between 9 AM to 8 PM on Monday through Friday, only between LOAM to 6 PM on Saturday, never on Sunday, and/or the like).

As further shown in FIG. 1A, and as shown by reference number 110, the message sync data structure can store, in individual records (e.g., each record being associated with or identified by a unique ID), the message that is to be transmitted to the target recipient, time zone information associated with the target recipient, and/or the like. In some implementations, the message sync data structure can include a status identifier associated with each record and/or with the message of each record. The status identifier can, for example, be set to "New" (e.g., to indicate that the record or message of the record is newly-added to the message sync data structure and can be processed for transmission), "Queued for Parsing" (e.g., to indicate that the message of the record has been added to the parse queue for parsing), "Parsed" (e.g., to indicate that the message has been parsed), "Queued for Sending" (e.g., to indicate that the message of the record has been parsed and added to an appropriate time-zone-based job queue for delivery to a target recipient), "Sending" (e.g., to indicate that the message is in the process of being transmitted), "Sent" (e.g., to indicate that the message has been transmitted), "Synced" (e.g., to indicate that the transmitted message has been provided to, or synced to, the CRM object (e.g., the CRM lead object) to update the CRM object), and/or the like.

In some implementations, the message sync data structure can store additional information in each record, including, for example, a time stamp (e.g., to indicate a scheduled date and/or time for delivery of the message), a response message (e.g., from the target recipient) received via the messaging platform, a code (e.g., a hypertext transfer protocol (HTTP) code) received via the messaging platform, information relating to application programming interface (API) calls associated with the messaging platform, and/or the like.

In some implementations, the ADP (e.g., the data synchronizer, another process being executed in the ADP, and/or the like) can perform a check as to whether a target recipient of a message has opted not to receive any messages. In a case where the ADP determines that a target recipient of a message has opted not to receive any messages, the message sync data structure might not obtain and store the message.

As further shown by reference number 110, the ADP (e.g., the data synchronizer, the ADP messages object, another process being executed in the ADP, and/or the like) can initiate (e.g., trigger) the overall process—e.g., to initiate the flow of processing of messages, such as the dispatching, parsing, sending, and/or syncing of messages.

As shown by reference number 115, the dispatcher system can obtain record(s), from the message sync data structure, that include messages to be processed. In some implementations, the dispatcher system can be implemented as a clock-based process that controls a series of jobs. In some implementations, the dispatcher system can query the message sync data structure periodically (e.g., once per 5 seconds, once per 10 seconds, once per 15 seconds, once per 30 seconds, once per minute, and/or the like) for any records that are associated with a status identifier having the value "New."

As shown by reference number 120, the dispatcher system can add the unique ID(s) of any obtained record(s), that are associated with a status identifier having the value "New," to the parse queue. In some implementations, the dispatcher system can modify a value of the status identifier associated with the record in the message sync data structure (e.g., to a value "Queued for Parsing") based on adding the unique ID of the record to the parse queue.

In some implementations, the dispatcher system can generate logs based on the actions performed by the dispatcher system. For example, the dispatcher system can generate logs associated with initialization of a dispatch job, completion of a dispatch job, receipt of messages to be parsed, adding of messages to the parse queue, and/or the like. In some implementations, the dispatcher system can include error and/or exception handling as needed. For example, the dispatcher system can log errors associated with obtaining records from the message sync data structure, adding messages to the parse queue, updating status identifiers in the message sync data structure, and/or the like.

As shown by reference number 125, the parser system can obtain, from the message sync data structure, message(s) based on the unique ID(s) that have been added to the parse queue. As shown by reference number 130, the parser system can parse each of the message(s). In some implementations, the parser system can run periodically (e.g., once per 5 seconds, once per 10 seconds, once per 15 seconds, once per 30 seconds, once per minute, and/or the like). In some implementations, the parser system can identify dynamic content fields (e.g., merge fields) in the message, and populate the message with the appropriate content (e.g., the contact name, a representative name, and/or the like) to personalize the message for the target recipient. In some implementations, the dynamic content fields can include a field for a uniform resource locator (URL) that corresponds to a landing page at which the target recipient can place one or more purchases. In such a case, the URL can include an identifier (e.g., a commission ID) associated with a representative (e.g., a representative of the entity), that permits tracking of purchase(s) and accounting of commissions for the representative based on such purchase(s).

In some implementations, the parser system can utilize the unique ID(s) in the parse queue to query the ADP messages object for information regarding the target recipient of each message (e.g., to populate the dynamic content of each message), time zone information, and/or the like. In some implementations, the parser system can modify a value of the status identifier associated with the record in the message sync data structure based on parsing the message (e.g., to a value "Parsed"). In some implementations, the parser system can update each record in the message sync data structure with the corresponding parsed message.

Figure 1B:
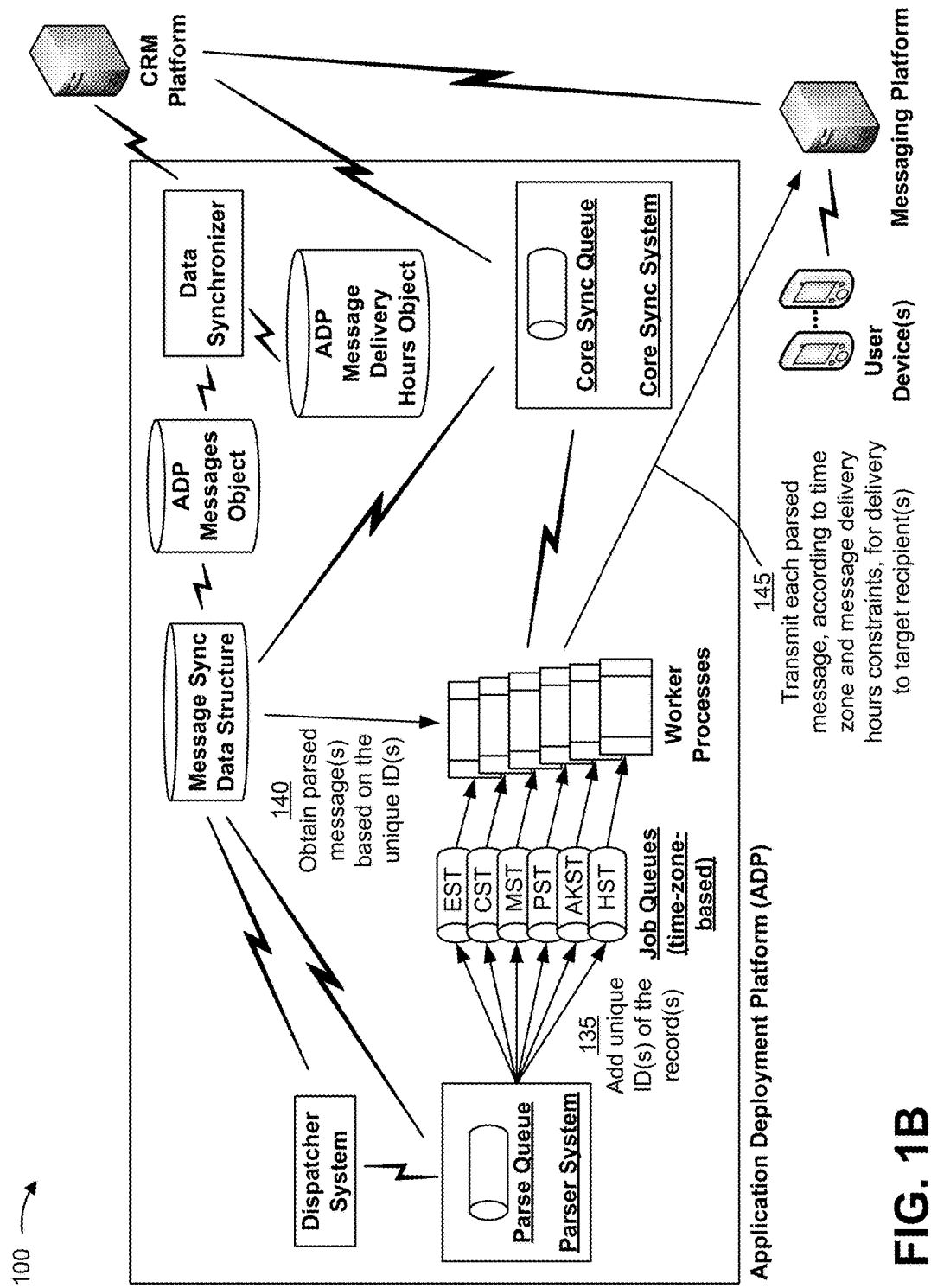

As shown in FIG. 1B, and as shown by reference number 135, the parser system can add the unique ID of each record, whose message has been parsed, to one of the time-zone-based job queues. As one example, the parser system can add the unique ID of a record, whose message has been parsed, to the EST job queue if a target recipient of the message is located in the eastern part of the United States. As another example, the parser system can add the unique ID of a record, whose message has been parsed, to the HST job queue if a target recipient of the message is located in Hawaii.

In some implementations, and similar to the dispatcher system, the parser system can generate logs based on the actions performed by the parser system. For example, the dispatcher system can generate logs associated with initialization of a parse job, completion of a parse job, adding of a parsed message to a time-zone-based job queue, and/or the like. In some implementations, the parser system can include error and/or exception handling as needed. For example, the parser system can log errors associated with obtaining records from the message sync data structure, parsing messages, adding parsed messages to the time-zone-based job queues, and/or the like.

As shown by reference number 140, the individual worker processes, associated with the respective time-zone-based job queues, can utilize the unique IDs, that have been added to the corresponding time-zone-based job queues, to obtain the corresponding parsed messages.

As shown by reference number 145, the individual worker processes can transmit the parsed messages to the messaging platform for delivery to the respective target recipients. In some implementations, a worker process can transmit a parsed message based on the message delivery hours constraint(s) stored in the ADP message delivery hours object. A worker process can perform job processing when a current time satisfies the constraint(s) (e.g., is within business hours), and can pause job processing when a current time does not satisfy the constraint(s) (e.g., is outside of business hours). A worker process can transmit a parsed message according to a time zone associated with the respective time-zone-based job queue. For example, a worker process associated with the EST job queue can transmit a parsed message according to the Eastern time zone (e.g., during business hours in the Eastern time zone).

In some implementations, the ADP is capable of identifying priorities associated with various message types (e.g., different message types may be associated with different priorities), and delivering messages based on the priorities. For example, some types of messages, such as employee-related messages, may be associated with one priority, some types of messages, such as campaign-related messages, may be associated with another priority, and so on. In a case where a first message is of a first type associated with a first priority, a second message is of a second type associated with a second priority that is lower than the first priority, and the first message and the second message are scheduled for delivery at the same date and/or time, the ADP may cause the first message to be delivered prior to causing the second message to be delivered.

In some implementations, each of the time-zone-based job queues can be throttled or rate limited—e.g., associated with a configurable maximum quantity of jobs that can be processed (e.g., a maximum quantity of API calls that can be made with respect to the messaging platform) per unit time (e.g., per second). In some implementations, the maximum quantity of jobs that can be processed per unit time can be the maximum quantity of jobs for all the time-zone-based job queues combined. In a case where certain time zones are associated with higher volumes of messages that need to be transmitted (e.g., the EST and/or CST time zones), higher maximum quantities of jobs per unit time can be configured for such time zones.

In some implementations, the ADP may perform load balancing with respect to the time-zone-based job queues. In such cases, the ADP may determine available remaining bandwidth for each of the time-zone-based job queues, and dynamically increase processing speed where workload exists based on any empty time-zone-based job queues and/or availability of bandwidth in one or more of the time-zone-based job queues.

Although not shown, a worker process can perform various actions associated with transmission of a message. In some implementations, a worker process can query the message sync data structure using the unique ID associated with the message, record, and/or job, split the message into multiple (e.g., two) parts as needed (e.g., based on any applicable message size constraints), facilitate communications with the messaging platform (e.g., by generating one or more API calls), causing the message (e.g., various parts of the message) to be transmitted, and/or the like.

Figure 1C:
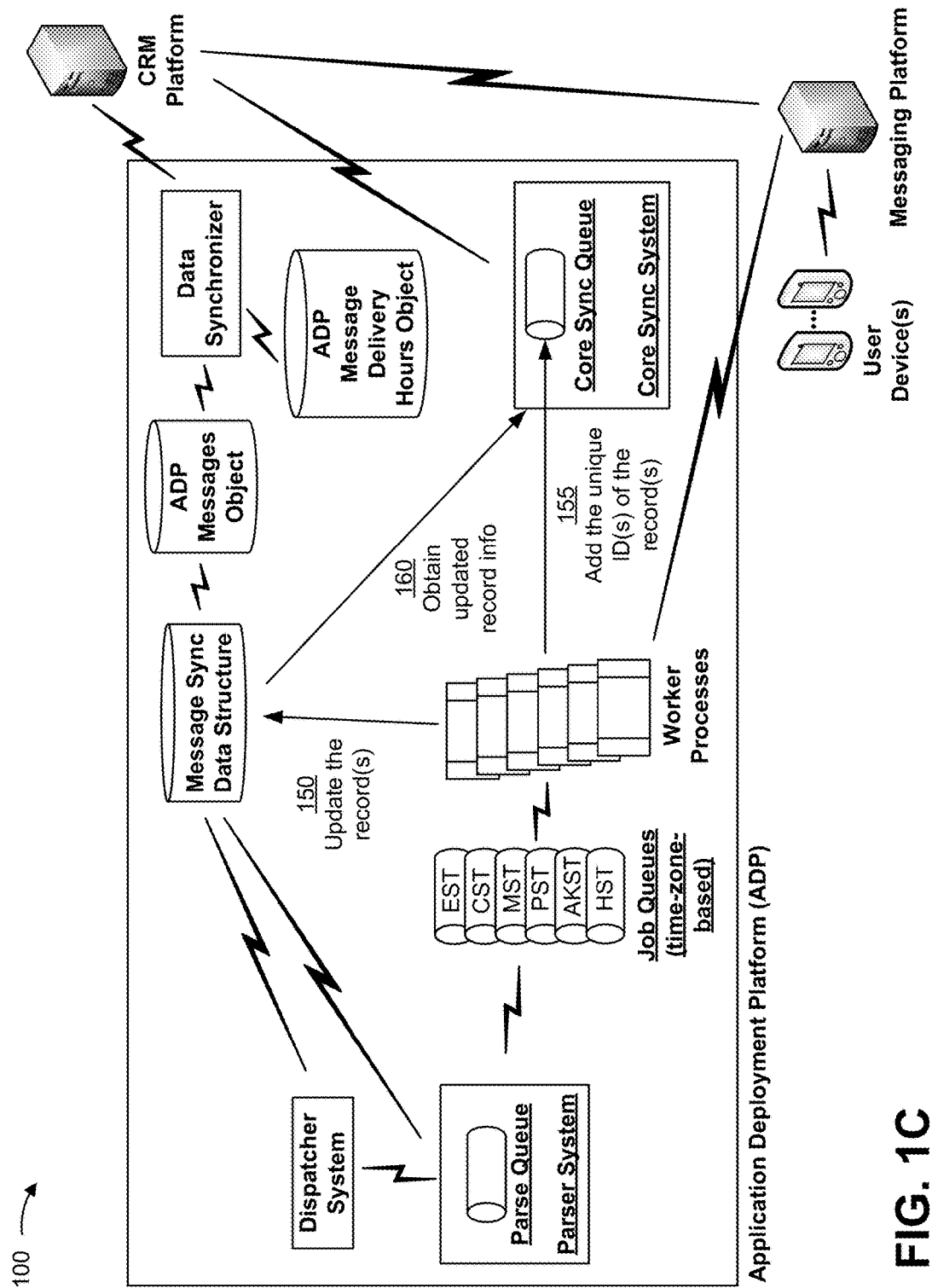

As shown in FIG. 1C, and as shown by reference number 150, the worker processes can update the record(s) in the message sync data structure, as appropriate. For example, in a case where a worker process prepares to cause a message to be transmitted, the worker process can modify a value of the status identifier associated with the record in the message sync data structure accordingly (e.g., to a value "Sending"). As another example, in a case where a worker process causes a message to be transmitted, the worker process can modify a value of the status identifier associated with the record in the message sync data structure accordingly (e.g., to a value "Sent"). As shown by reference number 155, the worker processes can add the unique ID(s) of the record(s) (whose parsed message(s) have been transmitted) to the core sync queue.

In some implementations, and similar to the dispatcher system, a worker process can generate logs based on the actions performed by the worker process. For example, the worker process can generate logs associated with initialization of a message transmission job, completion of a message transmission job, pausing of a time-zone-based job queue due to time-based rule(s) not being satisfied, and/or the like. In some implementations, the worker process can include error and/or exception handling as needed. For example, the worker process can log errors associated with the querying of the message sync data structure, API calls to the messaging platform, updating status identifiers in the message sync data structure, adding jobs to the core sync queue, and/or the like.

As shown by reference number 160, the core sync system can obtain updated record information from the message sync data structure. In some implementations, the core sync system can utilize the unique ID, added to the core sync queue by a worker process, to query the message sync data structure to obtain the record information. In some implementations, the record information can include a lead ID, a date and/or time that a message included in a record was transmitted (e.g., by the worker process and/or the messaging platform), the message that was transmitted, an identifier associated with a representative who is to service the lead (e.g., an owner ID), and/or the like.

Figure 1D:
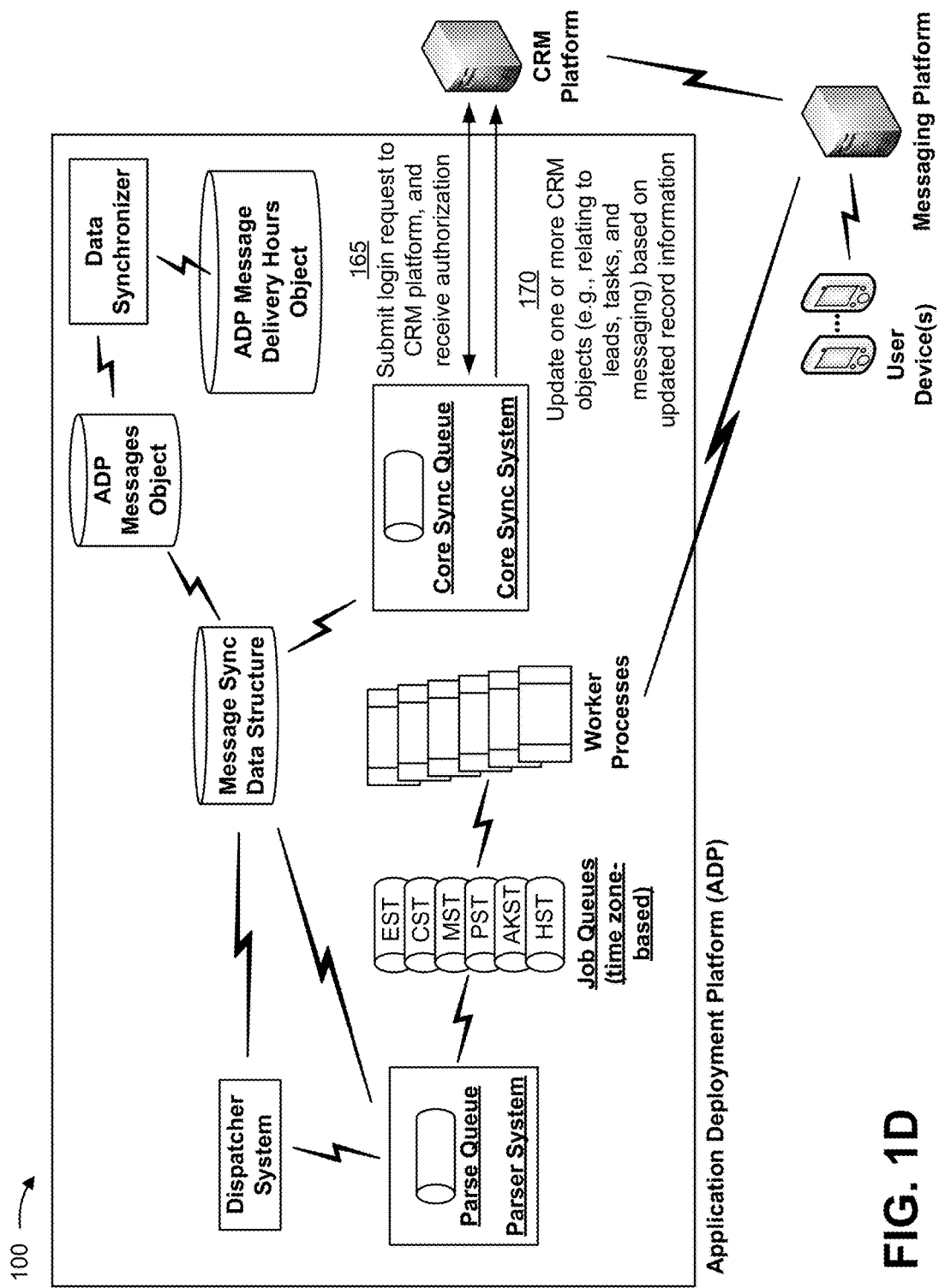

As shown in FIG. 1D, and as shown by reference number 165, the core sync system can submit a login request to the CRM platform and receive, from the CRM platform and based on the login request, authorization to access the CRM platform.

As shown by reference number 170, the core sync system can add data to and/or update one or more CRM objects based on the record information obtained from the message sync data structure. For example, the core sync system can update one or more of the CRM lead object, the CRM messages object, a CRM tasks object (e.g., with data regarding tasks that need to be performed by the entity, or a representative of the entity, such as following up with a customer), and/or the like.

In some implementations, the core sync system can add data to and/or update the CRM lead object based on the lead ID, the date and/or time that a message was transmitted, the message that was transmitted, and/or the like. In some implementations, the core sync system can cause one or more tasks to be created by adding data to and/or updating the CRM tasks object (e.g., based on the lead ID, the owner ID, and/or the like) including, for example, information regarding a direction of the message (e.g., inbound or outbound), a task priority (e.g., "Low," "Normal," "High," and/or the like), a task status (e.g., "In Process," "Completed," and/or the like), a task subject (e.g., "Text Message Sent"), and/or the like. In some implementations, the core sync system can update the CRM messages object with information regarding a status of the message, any response message(s) received (e.g., response(s) from a target recipient), and/or the like.

In this way, information regarding a sequence of events associated with the transmission of each message can be provided to the CRM platform to update corresponding records in the CRM platform.

In some implementations, and similar to the dispatcher system, the core sync system can generate logs based on the actions performed by the core sync system. For example, the core sync system can generate logs associated with initialization of a core sync job, completion of a core sync job, and/or the like. In some implementations, the core sync system can include error and/or exception handling as needed. For example, the core sync system can log errors associated with updating a lead object, updating the message sync data structure, task creation, updating a CRM object associated with messaging, the querying of the message sync data structure, failed jobs, login errors, and/or the like.

Although not shown, in some implementations, the ADP can additionally include application monitoring functions associated with the parse queue, the time-zone-based job queues, and/or the core sync queue, and error logging functions associated with such monitoring functions.

In this way, the ADP permits a high volume of messages to be processed and delivered in parallel (e.g., in cases where business hours overlap across multiple time zones), which increases the overall message processing and delivery efficiency (e.g., maximizes a quantity of outbound messages per unit time), thereby conserving power, computing, and memory resources that would otherwise be needed to facilitate inefficient, prolonged message delivery.

As indicated above, FIGS. 1A-1D are provided merely as examples. Other examples are possible and can differ from what was described with regard to FIGS. 1A-1D.

Figure 2:
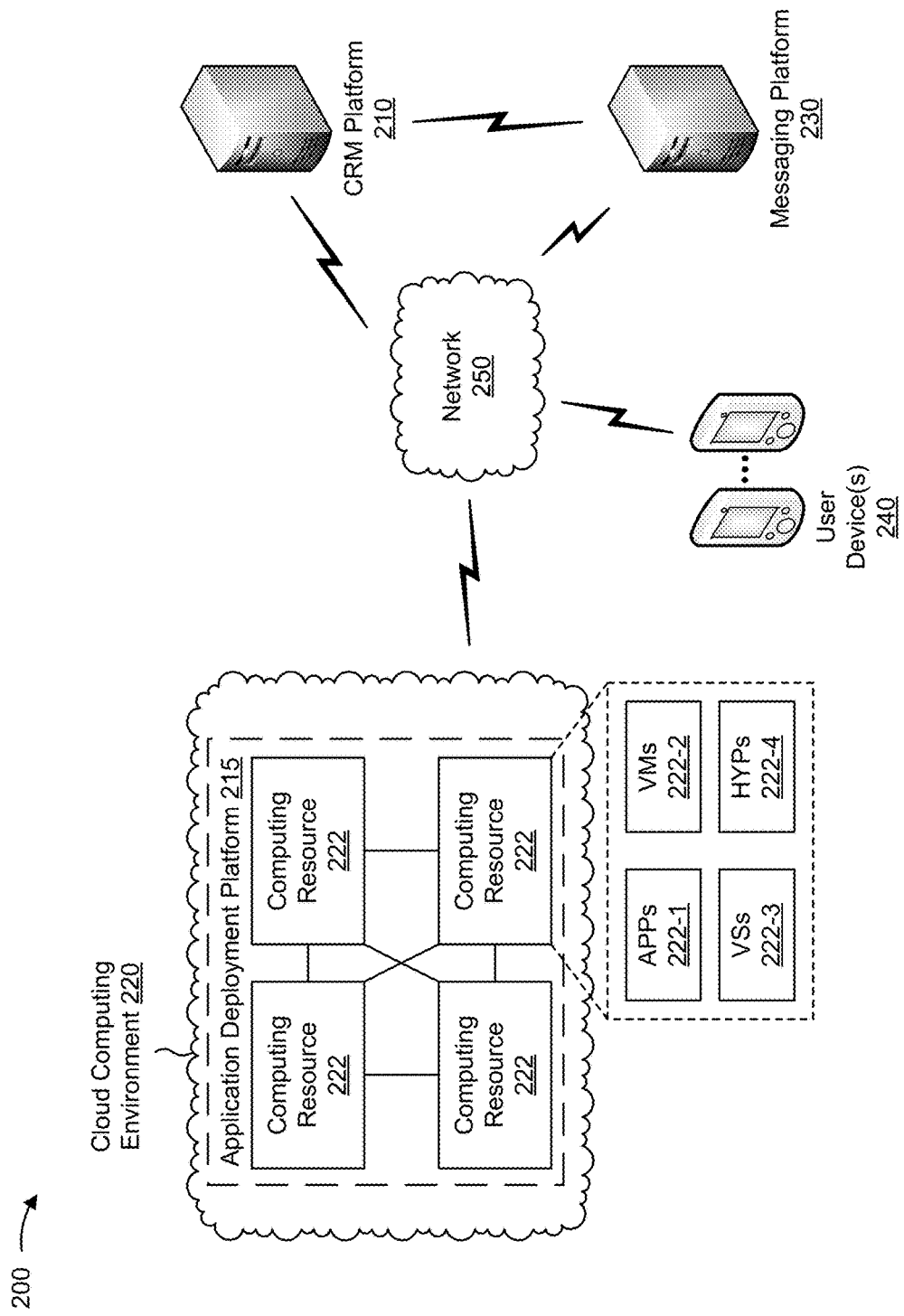
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a CRM platform 210, an application deployment platform (ADP) 215 (e.g., hosted in a cloud computing environment 220), a messaging platform 230, user device(s) 240, and a network 250. Devices of environment 200 can interconnect via wired connections, wireless connections, or a combination of wired and wireless connections.

CRM platform 210 includes one or more devices capable of receiving, generating, storing, processing, and/or providing information associated with ADP 215, messaging platform 230, and/or user device 240. CRM platform 210 can include a server device or a group of server devices. In some implementations, CRM platform 210 can be hosted in a cloud computing environment. Alternatively, in some implementations, CRM platform 210 is not cloud-based or can be partially cloud-based.

ADP 215 includes one or more devices capable of receiving, generating, storing, processing, and/or providing information associated with CRM platform 210, messaging platform 230, and/or user device 240. ADP 215 can include a server device or a group of server devices. In some implementations, as shown, ADP 215 can be hosted in cloud computing environment 220. Notably, while implementations described herein describe ADP 215 as being hosted in cloud computing environment 220, in some implementations, ADP 215 is not cloud-based or can be partially cloud-based.

Cloud computing environment 220 includes an environment that delivers computing as a service, whereby shared resources, services, etc. can be provided to CRM platform 210, messaging platform 230, and/or user device 240. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host ADP 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by CRM platform 210, messaging platform 230, and/or user device 240. Application 222-1 can eliminate a need to install and execute the software applications on CRM platform 210, messaging platform 230, and/or user device 240. For example, application 222-1 can include software associated with ADP 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system ("OS"). A process virtual machine can execute a single program, and can support a single process. In some implementations, virtual machine 222-2 can execute on behalf of a user or device (e.g., CRM platform 210, messaging platform 230, and/or user device 240), and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Messaging platform 230 includes one or more devices capable of receiving, generating, storing, processing, and/or providing information associated with CRM platform 210, ADP 215, and/or user device 240. Messaging platform 230 can include a server device or a group of server devices. In some implementations, messaging platform 230 can be hosted in a cloud computing environment. Alternatively, in some implementations, messaging platform 230 is not cloud-based or can be partially cloud-based.

User device 240 includes one or more devices capable of receiving, generating, storing, processing, and/or providing information associated with CRM platform 210, ADP 215, and/or messaging platform 230. For example, user device 240 can include a communication and computing device, such as a mobile phone (e.g., a smart phone, a radiotelephone, etc.), a tablet computer, a handheld computer, a wearable communication device (e.g., a smart wristwatch, a pair of smart eyeglasses, etc.), or a similar type of device.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
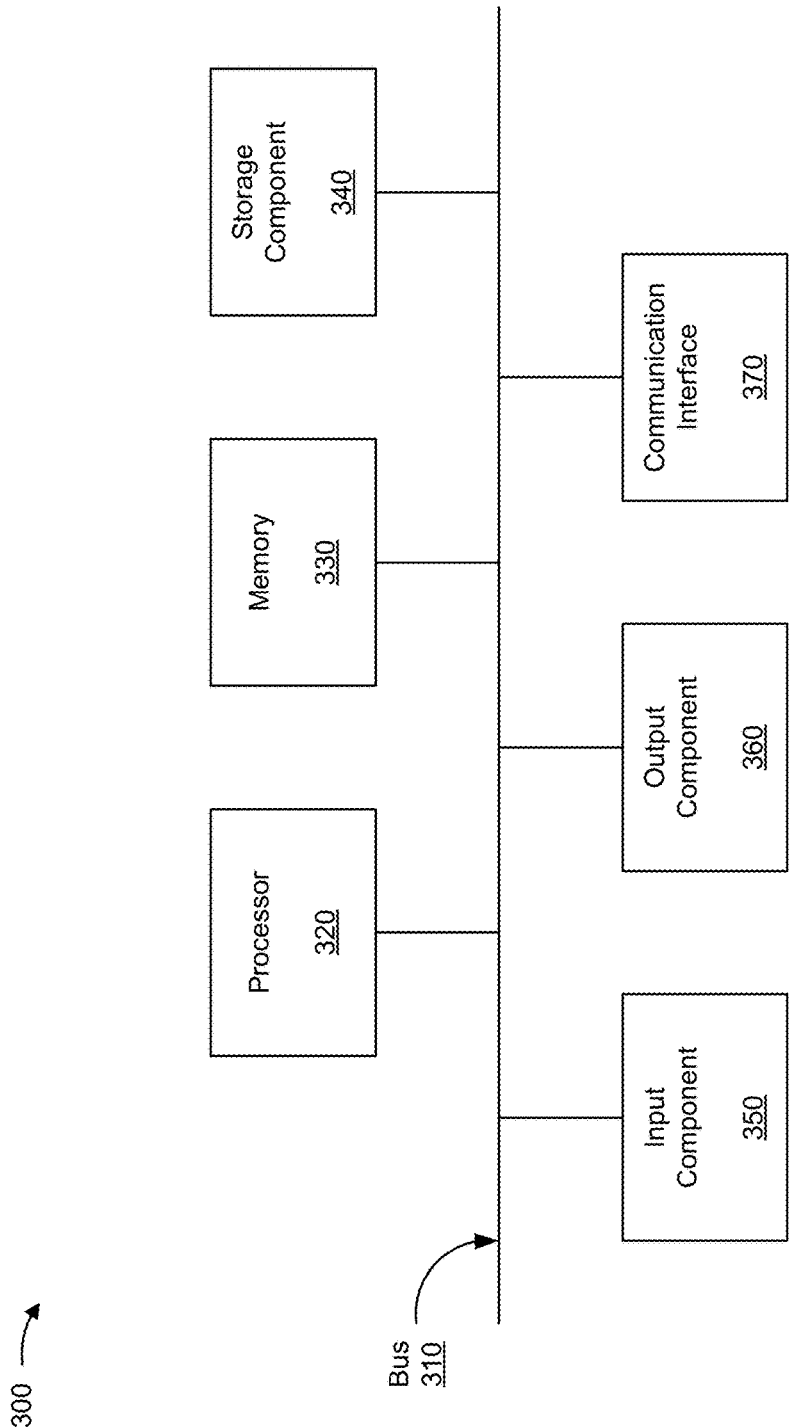
FIG. 3 is a diagram of example components of one or more devices of FIG. 2.

FIG. 3 is a diagram of example components of a device 300. Device 300 can correspond to CRM platform 210, ADP 215, messaging platform 230, and/or user device 240. In some implementations, CRM platform 210, ADP 215, messaging platform 230, and/or user device 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
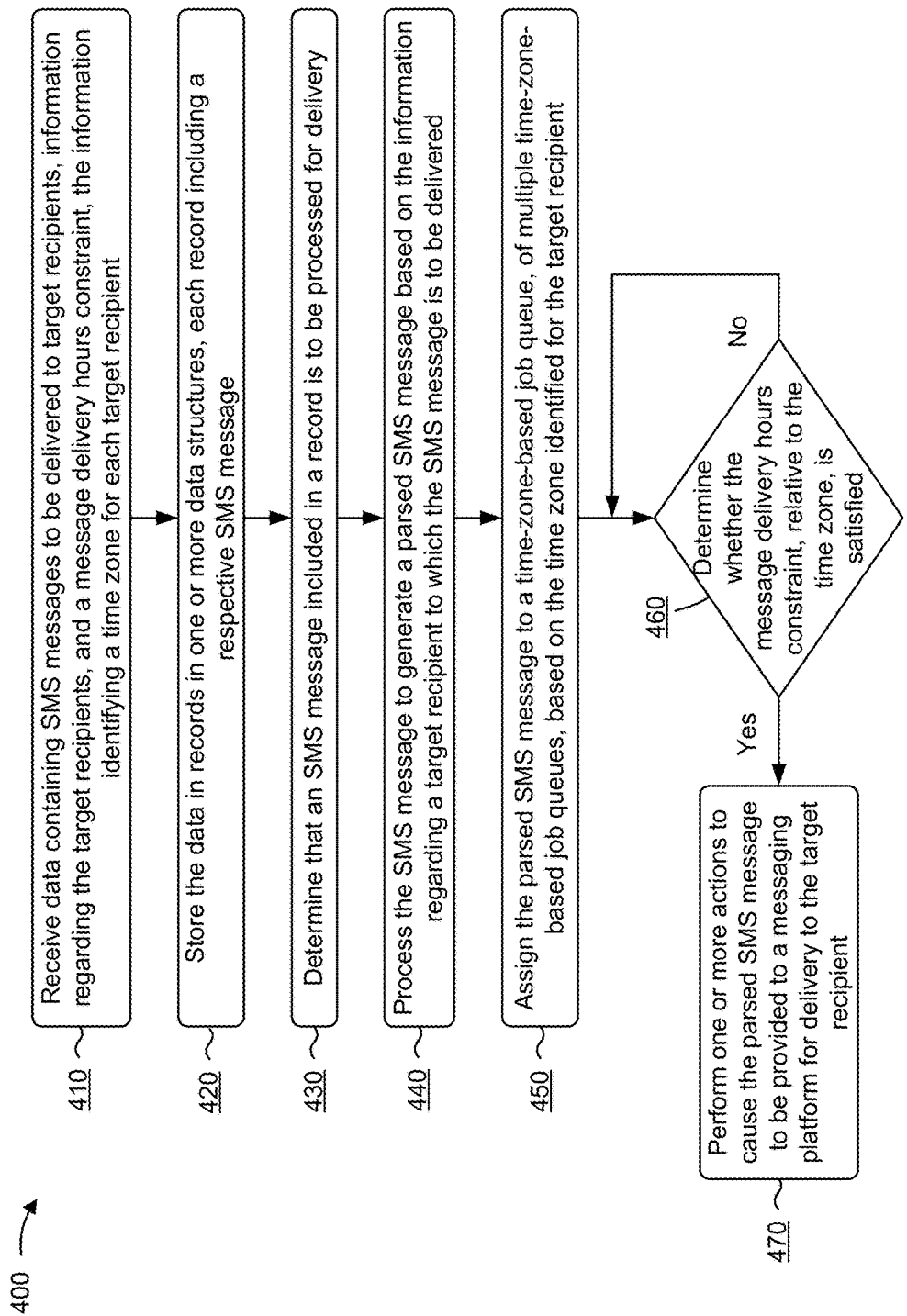
FIG. 4 is a flow chart of an example process for processing and delivering messages.

FIG. 4 is a flow chart of an example process 400 for processing and delivering messages. In some implementations, one or more process blocks of FIG. 4 can be performed by ADP 215. In some implementations, one or more process blocks of FIG. 4 can be performed by another device or a group of devices separate from or including ADP 215, such as CRM platform 210, messaging platform 230, and/or user device 240.

As shown in FIG. 4, process 400 can include receiving data containing SMS messages to be delivered to target recipients, information regarding the target recipients, and a message delivery hours constraint, where the information identifies a time zone for each target recipient (block 410). For example, ADP 215 (e.g., using processor 320, memory 330, storage component 340, communication interface 370, and/or the like) can receive, from CRM platform 210 (e.g., via network 250), data containing SMS messages to be delivered to target recipients, information regarding the target recipients, and a message delivery hours constraint, where the information identifies a time zone for each target recipient. In practice, ADP 215 can receive data containing thousands, millions, billions, etc. of SMS messages to be delivered to thousands, millions, billions, etc. of target recipients. In this way, ADP 215 can receive data containing SMS messages to be delivered to target recipients in a manner that cannot be performed manually or objectively by a human actor.

In some implementations, ADP 215 can receive the data in a manner that is the same as or similar to that described above with respect to FIGS. 1A-1D. For example, ADP 215 can receive the data from one or more CRM objects stored in CRM platform 210.

In this way, ADP 215 can receive data containing SMS messages to be delivered to target recipients, information regarding the target recipients, and a message delivery hours constraint, which can enable ADP 215 to store the data in records in one or more data structures.

As further shown in FIG. 4, process 400 can include storing the data in records in one or more data structures, where each record includes a respective SMS message (block 420). For example, ADP 215 (e.g., using processor 320, memory 330, storage component 340, and/or the like) can store the data in records in one or more data structures, where each record includes a respective SMS message. In practice, ADP 215 can store data in thousands, millions, billions, etc. of records. In this way, ADP 215 can store data in a manner that cannot be performed manually or objectively by a human actor.

In some implementations, ADP 215 can store the data in a manner that is the same as or similar to that described above with respect to FIGS. 1A-1D. For example, ADP 215 can store the data in a message sync data structure, an ADP messages object, and ADP message delivery hours objects, and/or the like.

In this way, ADP 215 can store the data in records in one or more data structures, which can enable ADP 215 to determine that an SMS message included in a record is to be processed for delivery.

As further shown in FIG. 4, process 400 can include determining that an SMS message included in a record is to be processed for delivery (block 430). For example, ADP 215 (e.g., using processor 320, memory 330, storage component 340, and/or the like) can determine that an SMS message included in a record is to be processed for delivery. In practice, ADP 215 can perform thousands, millions, billions, etc. of determinations relating to SMS messages. In this way, ADP 215 can perform determinations relating to SMS messages in a manner that cannot be performed manually or objectively by a human actor.

In some implementations, ADP 215 can determine that an SMS message included in a record is to be processed for delivery in a manner that is the same as or similar to that described above with respect to FIGS. 1A-1D. For example, ADP 215 can identify records in a message sync data structure that are associated with a certain status identifier (e.g., a status identifier have the value "New" and/or the like).

In this way, ADP 215 can determine that an SMS message included in a record is to be processed for delivery, which can enable ADP 215 to process the SMS message to generate a parsed SMS message based on the information regarding a target recipient to which the SMS message is to be delivered.

As further shown in FIG. 4, process 400 can include processing the SMS message to generate a parsed SMS message based on the information regarding a target recipient to which the SMS message is to be delivered (block 440). For example, ADP 215 (e.g., using processor 320, memory 330, storage component 340, and/or the like) can process the SMS message (e.g., after determining that the SMS message is to be processed for delivery) to generate a parsed SMS message based on the information regarding a target recipient to which the SMS message is to be delivered. In practice, ADP 215 can process thousands, millions, billions, etc. of SMS messages to generate thousands, millions, billions, etc. of parsed SMS messages. In this way, ADP 215 can process SMS messages in a manner that cannot be performed manually or objectively by a human actor.

In some implementations, ADP 215 can process the SMS message in a manner that is the same as or similar to that described above with respect to FIGS. 1A-1D. For example, ADP 215 can parse the SMS message to populate the SMS message with dynamic content (e.g., a name of the target recipient, a name of a local brick-and-mortar store, and/or the like).

In this way, ADP 215 can process the SMS message to generate a parsed SMS message based on the information regarding a target recipient to which the SMS message is to be delivered, which can enable ADP 215 to assign the parsed SMS message to a time-zone-based job queue, of multiple time-zone-based job queues, based on the time zone identified for the target recipient.

As further shown in FIG. 4, process 400 can include assigning the parsed SMS message to a time-zone-based job queue, of multiple time-zone-based job queue, based on the time zone identified for the target recipient (block 450). For example, ADP 215 (e.g., using processor 320, memory 330, storage component 340, and/or the like) can assign the parsed SMS message to a time-zone-based job queue, of multiple time-zone-based job queue, based on the time zone identified for the target recipient. In practice, ADP 215 can assign thousands, millions, billions, etc. of parsed SMS messages to time-zone-based job queues based on time zones identified for thousands, millions, billions, etc. of target recipients. In this way, ADP 215 can assign parsed SMS messages to time-zone-based job queues in a manner that cannot be performed manually or objectively by a human actor.

In some implementations, ADP 215 can assign the parsed SMS message to a time-zone-based job queue in a manner that is the same as or similar to that described above with respect to FIGS. 1A-1D. For example, in a case where the target recipient is located in the eastern part of the United States, ADP 215 can assign the parsed SMS message to a job queue that corresponds to the Eastern Time zone.

In this way, ADP 215 can assign the parsed SMS message to a time-zone-based job queue, of multiple time-zone-based job queues, based on the time zone identified for the target recipient, which can enable ADP 215 to determine whether the message delivery hours constraint, relative to the time zone identified for the target recipient, is satisfied.

As further shown in FIG. 4, process 400 can include determining whether the message delivery hours constraint, relative to the time zone identified for the target recipient, is satisfied (block 460). For example, ADP 215 (e.g., using processor 320, memory 330, storage component 340, and/or the like) can determine whether the message delivery hours constraint, relative to the time zone identified for the target recipient, is satisfied. In practice, ADP 215 can perform thousands, millions, billions, etc. of determinations relating to message delivery hours constraints. In this way, ADP 215 can perform determinations relating to message delivery hours constraints in a manner that cannot be performed manually or objectively by a human actor.

In some implementations, ADP 215 can determine whether the message delivery hours constraint, relative to the time zone identified for the target recipient, is satisfied in a manner that is the same as or similar to that described above with respect to FIGS. 1A-1D. For example, in a case where the message delivery hours constraint permits delivery of messages to a target recipient only during business hours, ADP 215 can determine whether a current time, in the time zone identified for the target recipient, is within business hours or is outside of business hours.

In this way, ADP 215 can determine whether the message delivery hours constraint, relative to the time zone identified for the target recipient, is satisfied, which can enable ADP 215 to perform one or more actions to cause the parsed SMS message to be provided to a messaging platform (e.g., messaging platform 230) for delivery to the target recipient.

As further shown in FIG. 4, if the message delivery hours constraint, relative to the time zone identified for the target recipient, is not satisfied (block 460—NO), process 400 can return to block 460.

As further shown in FIG. 4, if the message delivery hours constraint, relative to the time zone identified for the target recipient, is satisfied (block 460—YES), process 400 can include performing one or more actions to cause the parsed SMS message to be provided to a messaging platform for delivery to the target recipient (block 470). For example, ADP 215 (e.g., using processor 320, memory 330, storage component 340, communication interface 370, and/or the like) can perform one or more actions to cause the parsed SMS message to be provided to messaging platform 230 for delivery to the target recipient. In practice, ADP 215 can perform thousands, millions, billions, etc. of actions relating to the delivery of parsed SMS messages to thousands, millions, billions, etc. of target recipients. In this way, ADP 215 can perform actions relating to the delivery of parsed SMS messages in a manner that cannot be performed manually or objectively by a human actor.

In some implementations, ADP 215 can performing one or more actions in a manner that is the same as or similar to that described above with respect to FIGS. 1A-1D. For example, ADP 215 can cause the parsed SMS message to be provided to messaging platform 230 if a current time is within business hours.

In this way, ADP 215 can perform one or more actions to cause the parsed SMS message to be provided to messaging platform 230 for delivery to the target recipient.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
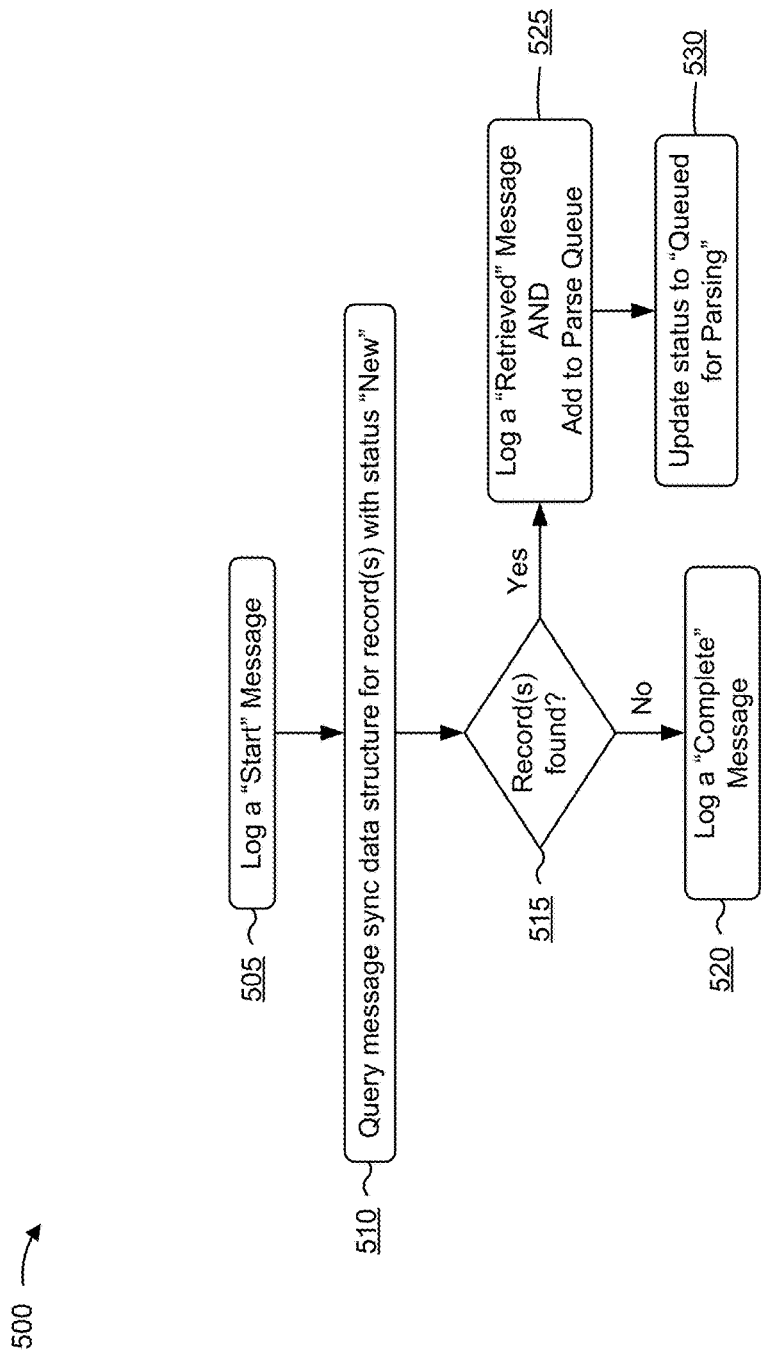
FIGS. 5-7 are diagrams of example processes relating to the example process shown in FIG. 4.

FIG. 5 is a diagram of an example process 500 relating to example process 400 shown in FIG. 4. In some implementations, process 500 can be performed by ADP 215. For example, process 500 can be performed by a dispatcher system of ADP 215.

As shown in FIG. 5, and as shown by reference number 505, ADP 215 can log a "Start" message. For example, the dispatcher system of ADP 215 can log a "Start" message (e.g., to log execution of process 500). Here, assume that a data synchronizer has received data, from CRM object(s) (e.g., a CRM lead object, a CRM brick-and-mortar-stores object, a CRM message delivery hours object, a CRM messages object, and/or the like) stored in a CRM platform and associated with an entity (e.g., a company), and has stored the received data in objects/data structures (e.g., a message sync data structure, an ADP messages object, an ADP message delivery hours object, and/or the like), as described above with respect to FIGS. 1A-1D.

As shown by reference number 510, ADP 215 can query the message sync data structure for any record(s) with a status identifier having the value "New." For example, the dispatcher system can query the message sync data structure for any record(s) with a status identifier having the value "New." In some implementations, the dispatcher system can periodically query the message sync data structure (e.g., once every 5 seconds, once every 10 seconds, once every 15 seconds, once every 20 seconds, and/or the like) for such record(s).

As shown by reference number 515, ADP 215 can determine whether any record(s) with a status identifier having the value "New" are found in the message sync data structure. For example, the dispatcher system can determine whether any record(s) with a status identifier having the value "New" are found in the message sync data structure.

As shown by reference number 520, if ADP 215 determines that no record(s) with a status identifier having the value "New" are found in the message sync data structure (reference number 515—NO), then ADP 215 can log a "Complete" message. For example, the dispatcher system can log a "Complete" message (e.g., to log completion of execution of process 500).

As shown by reference number 525, if ADP 215 determines that record(s) with a status identifier having the value "New" are found in the message sync data structure (reference number 515—YES), then ADP 215 can log a "Retrieved" message, and add the record(s) (e.g., unique ID(s) of the record(s)) to a parse queue. For example, the dispatcher system can log a "Retrieved" message (e.g., to log that one or more records have been found in, or obtained from, the message sync data structure), and add the record(s) (e.g., unique ID(s) of the record(s)) to a parse queue.

As shown by reference number 530, ADP 215 can update a status identifier of the record(s) with a value "Queued for Parsing" in the data structure. For example, the dispatcher system can update a status identifier of the record(s) with a value "Queued for Parsing" in the data structure.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Figure 6:
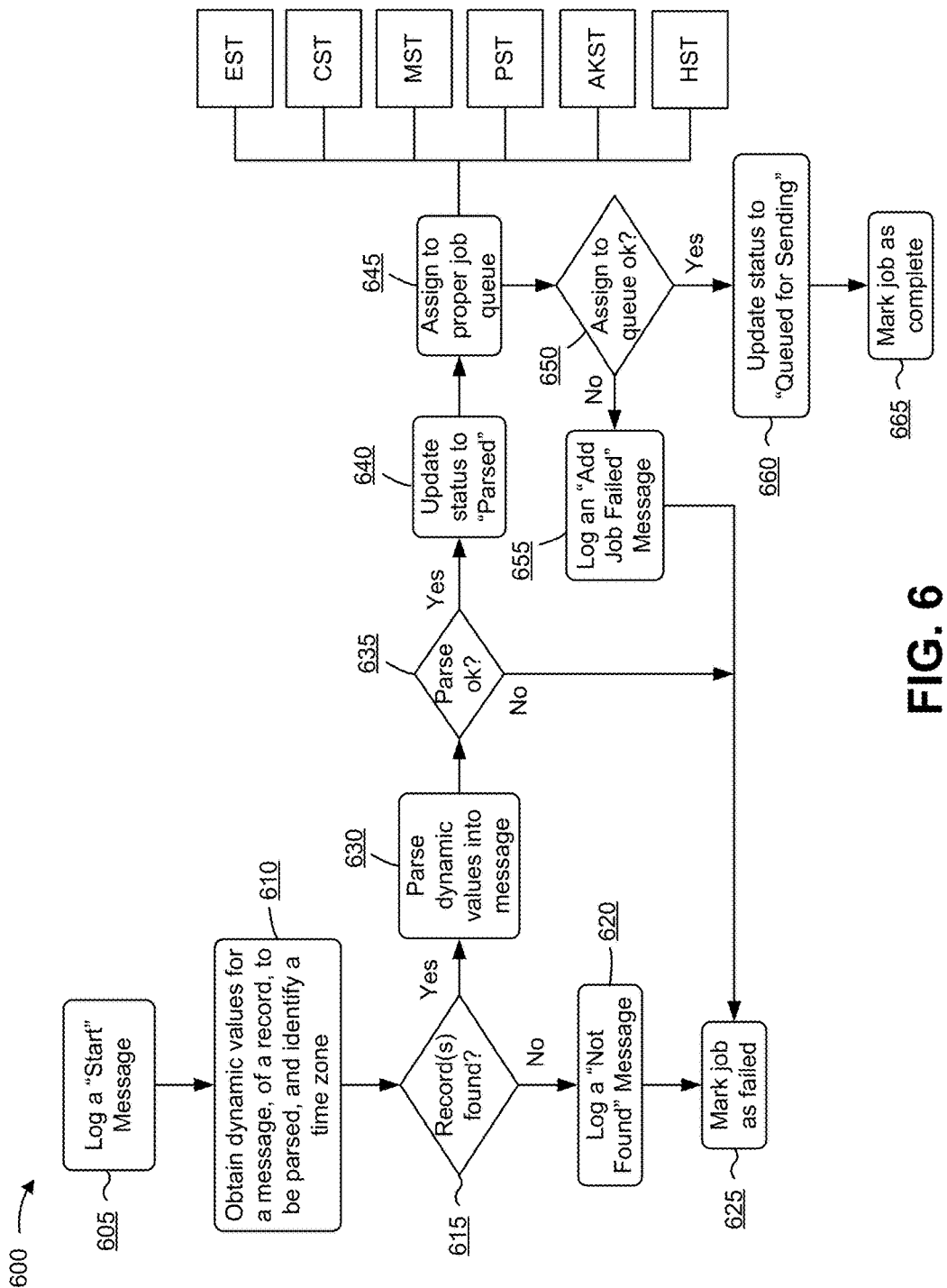

FIG. 6 is a diagram of an example process 600 relating to example process 400 shown in FIG. 4. In some implementations, process 600 can be performed by ADP 215. For example, process 600 can be performed by a parser system of ADP 215.

As shown in FIG. 6, and as shown by reference number 605, ADP 215 can log a "Start" message. For example, the parser system of ADP 215 can log a "Start" message (e.g., to log execution of process 600). Here, assume that process 600 follows an execution of process 500 (e.g., after a job has been added to a parse queue associated with the parser system, as described above with respect to FIG. 5 and/or FIGS. 1A-1D).

As shown by reference number 610, ADP 215 can obtain (e.g., based on the job added to the parse queue) dynamic values for a message to be parsed, and identify a time zone. For example, the parser system can obtain dynamic values for a message to be parsed, and identify a time zone associated with a target recipient of the message.

As shown by reference number 615, ADP 215 can determine if any record(s) in the message sync data structure are found. For example, the parser system can determine if any record(s), that correspond to the dynamic values obtained as described above with respect to reference number 610, are found in the message sync data structure. In some implementations, the parser system can periodically query the message sync data structure (e.g., once every 5 seconds, once every 10 seconds, once every 15 seconds, once every 20 seconds, and/or the like), described above with respect to process 500, to identify record(s) with a status identifier having a value "Queued for Parsing."

If ADP 215 determines that record(s) are not found in the message sync data structure (reference number 615—NO), as shown by reference number 620, ADP 215 can log a "Not Found" message. For example, the parser system can log a "Not Found" message, and/or the like. As shown by reference number 625, ADP 215 can mark the job as failed. For example, the parser system can mark the job as failed.

If ADP 215 determines that record(s) are found in the message sync data structure (reference number 615—YES), as shown by reference number 630, ADP 215 can parse the dynamic values into a message. For example, the parser system can parse the dynamic values into the message included in the record(s).

As shown by reference number 635, ADP 215 can determine whether the parsing is successful. For example, the parser system can determine whether the parsing is successful.

If ADP 215 determines that parsing is not successful (reference number 635—NO), as shown by reference number 625, ADP 215 can mark the job as failed. For example, the parser system can mark the job as failed. Although not shown, in some implementations, if ADP 215 determines that parsing is not successful (e.g., if one or more values cannot be parsed into the message), ADP 215 can re-attempt parsing (e.g., by parsing an alternative value into the message (e.g., in a case where a value to be parsed includes a name of company representative that is no longer employed by the company, ADP 215 can parse an alternative value, such as a value that includes a name of a manager of the company representative)). In this way, an alternative value can be parsed into a message to prevent any blanks from appearing in the final message that is sent to a target recipient.

If ADP 215 determines that the parsing is successful (reference number 635—YES), as shown by reference number 640, ADP 215 can update a value of a status identifier of the record(s) in the message sync data structure to "Parsed." For example, the parser system can update a value of a status identifier of the record(s) in the message sync data structure to "Parsed."

As shown by reference number 645, ADP 215 can assign the message (e.g., by passing a unique ID of a record that includes the message) to an appropriate time-zone-based job queue. For example, the parser system can assign the message (e.g., by passing a unique ID of a record that includes the message) to an appropriate time-zone-based job queue (e.g., a EST time-zone-based job queue, a CST time-zone-based job queue, an MST time-zone-based job queue, a PST time-zone-based job queue, an AKST time-zone-based job queue, an HST time-zone-based job queue, and/or the like).

As shown by reference number 650, ADP 215 can determine whether the assignment to the time-zone-based job queue is successful. For example, the parser system can determine whether the assignment to the time-zone-based job queue is successful.

If ADP 215 determines that the assignment to the time-zone-based job queue is not successful (reference number 650—NO), as shown by reference number 655, ADP 215 can log an "Add Job Failed" message, and process 600 can proceed to reference number 625. For example, the parser system can log an "Add Job Failed" message and/or the like, and process 600 can proceed to reference number 625.

If ADP 215 determines that the assignment to the time-zone-based job queue is successful (reference number 650—YES), as shown by reference number 660, ADP 215 can update a value of a status identifier of the record(s) in the message sync data structure to "Queued for Sending." For example, the parser system can update a value of a status identifier of the record(s) in the message sync data structure to "Queued for Sending." As shown by reference number 665, ADP 215 can mark the job as complete. For example, the parser system can mark the job as complete.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

Figure 7:
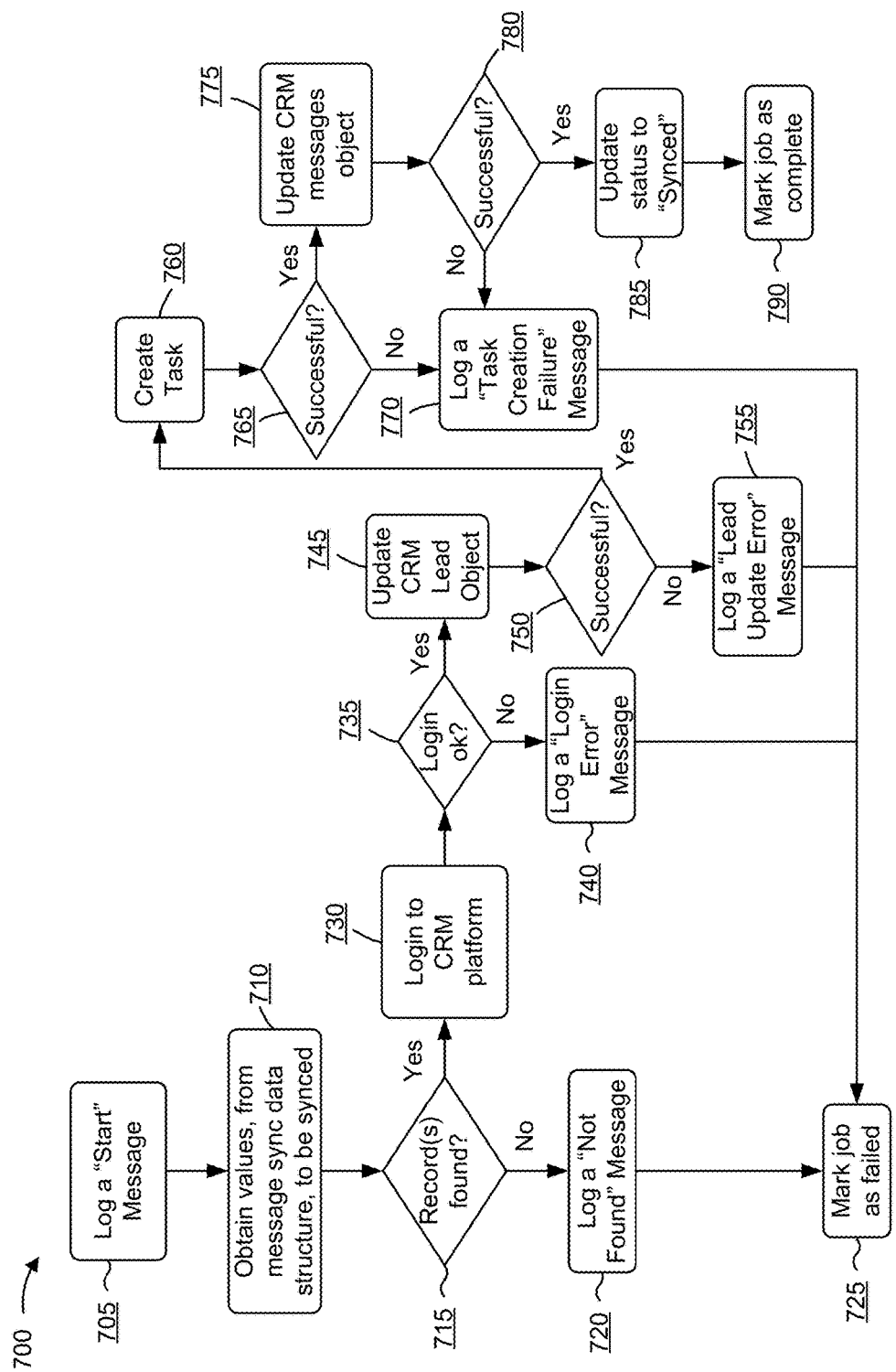

FIG. 7 is a diagram of an example process 700 relating to example process 400 shown in FIG. 4. In some implementations, process 700 can be performed by ADP 215. For example, process 700 can be performed by a core sync system of ADP 215.

As shown in FIG. 7, and as shown by reference number 705, ADP 215 can log a "Start" message. For example, the core sync system of ADP 215 can log a "Start" message (e.g., to log execution of process 700). Here, assume that process 700 follows an execution of process 600 (e.g., after a job has been added to a core sync queue associated with the core sync system, such as after a unique ID of a record has been added to the core sync queue by one or more worker processes associated with the time-zone-based job queues, as described above with respect to FIG. 6 and/or FIGS. 1A-1D).

As shown by reference number 710, ADP 215 can obtain (e.g., based on the unique ID added to the core sync queue) values, from the message sync data structure, to be synced. For example, the core sync system can obtain, from the data structure, values to be synced.

As shown by reference number 715, ADP 215 can determine whether record(s) are found in the message sync data structure. For example, the core sync system can determine whether record(s) are found in the message sync data structure.

If ADP 215 determines that record(s) are not found in the message sync data structure (reference number 715—NO), as shown by reference number 720, ADP 215 can log a "Not Found" message. For example, the core sync system can log a "Not Found" message and/or the like. As shown by reference number 725, ADP 215 can mark the job as failed. For example, the core sync system can mark the job as failed.

If ADP 215 determines that record(s) are found in the message sync data structure (reference number 715—YES), as shown by reference number 730, ADP 215 can login to the CRM platform. For example, the core sync system can login to the CRM platform. As shown by reference number 735, ADP 215 can determine whether the login is successful. For example, the core sync system can determine whether the login is successful.

If ADP 215 determines that the login is unsuccessful (reference number 735—NO), as shown by reference number 740, ADP 215 can log a "Login Error" message, and process 700 can proceed to reference number 725. For example, the core sync system can log a "Login Error" message and/or the like, and process 700 can proceed to reference number 725.

If ADP 215 determines that the login is successful (reference number 735—YES), as shown by reference number 745, ADP 215 can update the CRM lead object. For example, the core sync system can update the CRM lead object stored in the CRM platform (e.g., using the values obtained from the message sync data structure, as described above with respect to reference number 710). As shown by reference number 750, ADP 215 can determine whether the update is successful. For example, the core sync system can determine whether the update is successful.

If ADP 215 determines that the update is unsuccessful (reference number 750—NO), as shown by reference number 755, ADP 215 can log a "Lead Update Error" message, and process 700 can proceed to reference number 725. For example, the core sync system can log a "Lead Update Error" message and/or the like, and process 700 can proceed to reference number 725.

If ADP 215 determines that the update is successful (reference number 750—YES), as shown by reference number 760, ADP 215 can create a task. For example, the core sync system can create a task that is associated with the updated lead object (e.g., by adding data to and/or updating the CRM tasks object). In some implementations, in a case where a target recipient of the message (for which values are to be synced) responds to the message, the core sync system can create a task for an associated representative (e.g., a representative of the entity) to follow up with the target recipient. In such a case, the core sync system can create a task and associate the task with the updated lead object in the CRM platform.

In some implementations, in a case where a type of lead associated with the message is related to an abandoned cart (e.g., where the target recipient abandoned a shopping cart on a web site associated with the entity), the core sync system can create a task for an associated representative (e.g., a representative of the entity) to schedule a follow-up with the target recipient (e.g., if no response by the target recipient is received within a threshold time period (e.g., within 60 hours of transmitting the message to the target recipient)).

As shown by reference number 765, ADP 215 can determine whether the task creation was successful. For example, the core sync system can determine whether the task creation is successful. If ADP 215 determines that the task creation is unsuccessful (reference number 765—NO), as shown by reference number 770, ADP 215 can log a "Task Creation Failure" message, and process 700 can proceed to reference number 725. For example, the core sync system can log a "Task Creation Failure" message and/or the like, and process 700 can proceed to reference number 725.

If ADP 215 determines that the task creation is successful (reference number 765—YES), as shown by reference number 775, ADP 215 can update the CRM messages object. For example, the core sync system can update the CRM messages object. As shown by reference number 780, ADP 215 can determine whether the update of the CRM messages object is successful. For example, the core sync system can determine whether the update of the SMS message field of the CRM messages object is successful.

If ADP 215 determines that the update is unsuccessful (reference number 780—NO), as shown by reference number 770, ADP 215 can log a corresponding error message, and process 700 can proceed to reference number 725. For example, the core sync system can log a corresponding error message, and process 700 can proceed to reference number 725.

If ADP 215 determines that the update is successful (reference number 780—YES), as shown by reference number 785, ADP 215 can update a value of a status identifier of the record(s) in the message sync data structure to "Synced." For example, the core sync system can update a value of a status identifier of the record(s) in the message sync data structure to "Synced."

As shown by reference number 790, ADP 215 can mark the job as complete. For example, the core sync system can mark the job as complete.

Although FIG. 7 shows example blocks of process 700, in some implementations, process 700 can include additional blocks, fewer blocks, different blocks, or differently arranged blocks than those depicted in FIG. 7. Additionally, or alternatively, two or more of the blocks of process 700 can be performed in parallel.

Some implementations, described herein, provide the capability for an entity (e.g., a company) to send a high volume of SMS messages to numerous target recipients in an efficient manner, and to conduct two-way messaging with the target recipients. In some implementations, ADP 215 (e.g., one or more applications deployed by the ADP) is capable of receiving, from CRM platform 210, messages to be delivered to target recipients, processing the messages, and dispositioning and scheduling the processed messages for delivery (e.g., for delivery by a messaging platform) through the use of multiple time-zone-based job queues that are configured to handle message delivery based on message delivery hours constraints (e.g., where messages are permitted to be sent only during certain hours, such as business hours) and the time zone that is associated with each target recipient. In this way, implementations described herein permit a high volume of messages to be processed and delivered in parallel (e.g., in cases where business hours overlap across multiple time zones), which increases the overall message processing and delivery efficiency (e.g., maximizes a quantity of outbound messages per unit time), thereby conserving power, computing, and memory resources that would otherwise be needed to facilitate inefficient, prolonged message delivery.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive data containing:
a plurality of short message service (SMS) messages to be delivered to a plurality of target recipients,
information regarding the plurality of target recipients, and
a message delivery hours constraint,
the information identifying a time zone for each target recipient of the plurality of target recipients;
store the data in a plurality of records in one or more data structures,
each record of the plurality of records including a respective SMS message of the plurality of SMS messages;
determine that an SMS message, that is included in a record of the plurality of records, is to be processed for delivery;
process the SMS message to generate a parsed SMS message after determining that the SMS message is to be processed for delivery and based on the information regarding a target recipient, of the plurality of target recipients, to which the SMS message is to be delivered;
assign the parsed SMS message to a time-zone-based job queue, of a plurality of time-zone-based job queues, based on the time zone identified for the target recipient;
determine whether the message delivery hours constraint, relative to the time zone identified for the target recipient, is satisfied after assigning the parsed SMS message to the time-zone-based job queue; and
perform one or more actions to cause the parsed SMS message to be provided to a messaging platform for delivery to the target recipient based on determining that the message delivery hours constraint, relative to the time zone identified for the target recipient, is satisfied.

2. The device of claim 1, wherein the information includes personal information regarding the target recipient and information regarding a brick-and-mortar store that is located proximate to a location of the target recipient; and
wherein the one or more processors, when processing the SMS message, are to:
process the SMS message to generate the parsed SMS message based on the personal information and the information regarding the brick-and-mortar store.

3. The device of claim 1, wherein the message delivery hours constraint specifies times in a day and/or days of a week during which messages are permitted to be delivered to the plurality of target recipients; and
wherein the one or more processors, when determining whether the message delivery hours constraint is satisfied, are to:
determine whether a current time of day and/or a current day of week satisfies the specified times in a day and/or the specified days of a week.

4. The device of claim 1, wherein the time-zone-based job queue corresponds to the time zone identified for the target recipient; and
wherein the one or more processors, when performing the one or more actions, are to:
perform the one or more actions to cause the parsed SMS message to be provided to the messaging platform further based on the time zone identified for the target recipient.

5. The device of claim 1, wherein the one or more processors are further to:
associate a status identifier with the record; and
wherein the one or more processors, when determining that the SMS message is to be processed for delivery, are to:
determine that the SMS message is to be processed for delivery based on the status identifier.

6. The device of claim 1, wherein the one or more processors are further to:
perform one or more actions to prevent the parsed SMS message from being provided to the messaging platform for delivery to the target recipient based on determining that the message delivery hours constraint is not satisfied.

7. The device of claim 1, wherein the one or more processors, when receiving the data, are to:
receive the data from a customer relationship management (CRM) platform.

8. A non-transitory computer-readable medium storing instructions, the instructions comprising:
one or more instructions that, when executed by one or more processors, cause the one or more processors to:
receive data containing:
a plurality of short message service (SMS) messages to be delivered to a plurality of target recipients,
information regarding the plurality of target recipients, and
a message delivery hours constraint,
the information identifying a time zone for each target recipient of the plurality of target recipients;
store the data in a plurality of records in one or more data structures,
each record of the plurality of records including a respective SMS message of the plurality of SMS messages;
determine that an SMS message, that is included in a record of the plurality of records, is to be processed for delivery;
process the SMS message to generate a parsed SMS message after determining that the SMS message is to be processed for delivery and based on the information regarding a target recipient, of the plurality of target recipients, to which the SMS message is to be delivered;
assign the parsed SMS message to a time-zone-based job queue, of a plurality of time-zone-based job queues, based on the time zone identified for the target recipient;
determine whether the message delivery hours constraint, relative to the time zone identified for the target recipient, is satisfied after assigning the parsed SMS message to the time-zone-based job queue; and
perform one or more actions to cause the parsed SMS message to be provided to a messaging platform for delivery to the target recipient based on determining that the message delivery hours constraint, relative to the time zone identified for the target recipient, is satisfied.

9. The non-transitory computer-readable medium of claim 8, wherein the information includes personal information regarding the target recipient and information regarding a brick-and-mortar store that is located proximate to a location of the target recipient; and wherein the one or more instructions, that cause the one or more processors to process the SMS message, cause the one or more processors to:

process the SMS message to generate the parsed SMS message based on the personal information and the information regarding the brick-and-mortar store.

10. The non-transitory computer-readable medium of claim 8, wherein the message delivery hours constraint specifies times in a day and/or days of a week during which messages are permitted to be delivered to the plurality of target recipients; and wherein the one or more instructions, that cause the one or more processors to determine whether the message delivery hours constraint is satisfied, cause the one or more processors to:

determine whether a current time of day and/or a current day of week satisfies the specified times in a day and/or the specified days of a week.

11. The non-transitory computer-readable medium of claim 8, wherein the time-zone-based job queue corresponds to the time zone identified for the target recipient; and wherein the one or more instructions, that cause the one or more processors to perform the one or more actions, cause the one or more processors to:

perform the one or more actions to cause the parsed SMS message to be provided to the messaging platform further based on the time zone identified for the target recipient.

12. The non-transitory computer-readable medium of claim 8, wherein the one or more instructions, when executed by the one or more processors, further cause the one or more processors to:

associate a status identifier with the record; and wherein the one or more instructions, that cause the one or more processors to determine that the SMS message is to be processed for delivery, cause the one or more processors to:

determine that the SMS message is to be processed for delivery based on the status identifier.

13. The non-transitory computer-readable medium of claim 8, wherein the one or more instructions, when executed by the one or more processors, further cause the one or more processors to:

perform one or more actions to prevent the parsed SMS message from being provided to the messaging platform for delivery to the target recipient based on determining that the message delivery hours constraint is not satisfied.

14. The non-transitory computer-readable medium of claim 8, wherein the one or more instructions, that cause the one or more processors to receive the data, cause the one or more processors to:

receive the data from a customer relationship management (CRM) platform.

15. A method, comprising:
receiving, by a device, data containing:
a plurality of short message service (SMS) messages to be delivered to a plurality of target recipients,
information regarding the plurality of target recipients, and
a message delivery hours constraint,
the information identifying a time zone for each target recipient of the plurality of target recipients;
storing, by the device, the data in a plurality of records in one or more data structures,
each record of the plurality of records including a respective SMS message of the plurality of SMS messages;
determining, by the device, that an SMS message, that is included in a record of the plurality of records, is to be processed for delivery;
processing, by the device, the SMS message to generate a parsed SMS message after determining that the SMS message is to be processed for delivery and based on the information regarding a target recipient, of the plurality of target recipients, to which the SMS message is to be delivered;
assigning, by the device, the parsed SMS message to a time-zone-based job queue, of a plurality of time-zone-based job queues, based on the time zone identified for the target recipient;
determining, by the device, whether the message delivery hours constraint, relative to the time zone identified for the target recipient, is satisfied after assigning the parsed SMS message to the time-zone-based job queue; and
performing, by the device, one or more actions to cause the parsed SMS message to be provided to a messaging platform for delivery to the target recipient based on determining that the message delivery hours constraint, relative to the time zone identified for the target recipient, is satisfied.

16. The method of claim 15, wherein the information includes personal information regarding the target recipient and information regarding a brick-and-mortar store that is located proximate to a location of the target recipient; and wherein processing the SMS message comprises:
processing the SMS message to generate the parsed SMS message based on the personal information and the information regarding the brick-and-mortar store.

17. The method of claim 15, wherein the message delivery hours constraint specifies times in a day and/or days of a week during which messages are permitted to be delivered to the plurality of target recipients; and wherein determining whether the message delivery hours constraint is satisfied comprises:
determining whether a current time of day and/or a current day of week satisfies the specified times in a day and/or the specified days of a week.

18. The method of claim 15, wherein the time-zone-based job queue corresponds to the time zone identified for the target recipient; and wherein performing the one or more actions comprises:
performing the one or more actions to cause the parsed SMS message to be provided to the messaging platform further based on the time zone identified for the target recipient.

19. The method of claim 15, further comprising:
associating a status identifier with the record; and
wherein determining that the SMS message is to be processed for delivery comprises:
determining that the SMS message is to be processed for delivery based on the status identifier.

20. The method of claim 15, wherein receiving the data comprises:

receiving the data from a customer relationship management (CRM) platform.

\* \* \* \* \*